US009599207B2

(12) United States Patent  
Mordukhovich (10) Patent No.: US 9,599,207 B2  
(45) Date of Patent: Mar. 21, 2017

(54) MANUAL TRANSMISSION WITH TORQUE CONVERTER

(71) Applicant: AVL Powertrain Engineering, Inc., Plymouth, MI (US)

(72) Inventor: Gregory Mordukhovich, Bloomfield Hills, MI (US)

(73) Assignee: AVL POWER TRAIN ENGINEERING, INC., Plymouth, MI (US)

( * ) Notice: Subject to any disclaimer, the term of this patent is extended or adjusted under 35 U.S.C. 154(b) by 152 days.

(21) Appl. No.: 14/565,846

(22) Filed: Dec. 10, 2014

(65) Prior Publication Data

US 2015/0167840 A1    Jun. 18, 2015

Related U.S. Application Data

(60) Provisional application No. 61/915,695, filed on Dec. 13, 2013.

(51) Int. Cl.
```
F16H 47/02        (2006.01)
F16H 47/06        (2006.01)
F16H 61/14        (2006.01)
```

(52) U.S. Cl.
CPC ............. *F16H 47/06* (2013.01); *F16H 61/14* (2013.01); *F16H 2306/42* (2013.01); *Y10T 74/19153* (2015.01)

(58) Field of Classification Search
CPC .......... F16H 47/08; F16H 47/085; F16H 3/66; F16H 3/663
USPC ...................................................... 74/731.1
See application file for complete search history.

(56) References Cited

U.S. PATENT DOCUMENTS

| | | |
|---|---|---|
| 3,593,596 A | 7/1971 | Race |
| 3,691,861 A | 9/1972 | Sturmer |
| 4,143,562 A * | 3/1979 | Murakami ................ F16H 3/66 |
| | | 475/276 |
| 4,314,487 A | 2/1982 | Ahlen |
| 4,583,426 A | 4/1986 | Chassagnette et al. |
| 4,860,861 A | 8/1989 | Gooch et al. |
| 4,869,128 A * | 9/1989 | Ohkubo ................... F16H 3/66 |
| | | 192/3.24 |
| 5,038,627 A | 8/1991 | Schwaiger et al. |
| 5,685,404 A | 11/1997 | Fukushima |

(Continued)

FOREIGN PATENT DOCUMENTS

| | | |
|---|---|---|
| CN | 201385579 Y | 1/2010 |
| CN | 201385579 Y | 1/2010 |

*Primary Examiner* — Ha D Ho  
(74) *Attorney, Agent, or Firm* — Harness, Dickey & Pierce, P.L.C.

(57) ABSTRACT

A power transmitting device for a vehicle having a power plant and a drivetrain is provided. The power transmitting device includes an output shaft that provides torque to the drivetrain and a manual transmission selectable between a first gear set having a first gear ratio and a second gear set having a second gear ratio that transmits power to the output shaft at different rotational speeds. The power transmitting device also includes a hydraulic torque converter that multiplies torque. Torque is multiplied through the torque converter and is transmitted to the output shaft from the torque converter when the first gear set is selected and is not multiplied through the torque converter when the second gear set is selected.

22 Claims, 5 Drawing Sheets

(56) References Cited

U.S. PATENT DOCUMENTS

| | | | |
|---|---|---|---|
| 5,772,548 A * | 6/1998 | Park | F16H 47/085 |
| | | | 475/275 |
| 5,954,607 A | 9/1999 | Nitsche et al. | |
| 5,992,589 A | 11/1999 | Fukushima | |
| 6,159,123 A * | 12/2000 | Gumpoltsberger | B60K 17/02 |
| | | | 188/140 A |
| 7,798,933 B2 * | 9/2010 | Krause | F16H 3/663 |
| | | | 475/275 |
| 9,377,094 B2 * | 6/2016 | Borntrager | F16H 47/08 |
| 2010/0084213 A1 | 4/2010 | Hoyle et al. | |
| 2013/0253783 A1 | 9/2013 | Gratton et al. | |

* cited by examiner

MANUAL TRANSMISSION WITH TORQUE CONVERTER

CROSS-REFERENCE TO RELATED APPLICATIONS

This application claims the benefit of U.S. Provisional Application No. 61/915,695, filed on Dec. 13, 2013. The entire disclosure of the above application is incorporated herein by reference.

FIELD

The present application relates to a manual transmission with a torque converter.

BACKGROUND

This section provides background information related to the present application which is not necessarily prior art.

Conventional manual transmissions ("MTs") can be desirable for their low cost and complexity, and are typically more fuel efficient than conventional automatic transmissions ("ATs"). However, conventional MTs require the operator to manually shift into and out of each gear while balancing the application of clutch pressure to engine speed. This operation can demand considerable driver concentration and/or fatigue, and can be particularly undesirable at low speeds or in stop-and-go conditions such as those experienced in cities, for example.

Conventional ATs, including planetary transmissions, continuously variable transmissions ("CVTs"), and dual clutch transmissions ("DCTs"), eliminate the need to shift gears while adjusting clutch and engine speed, and have other desirable characteristics, such as shift smoothness and reduced noise, vibration, and harshness ("NVH"). However, ATs are more complex and costly than MTs and typically suffer from inefficiencies that result in reduced fuel economy. Semi-automatic and electronically shifted manual transmissions are known in the art, but are likewise costly and complex when compared to MTs.

Generally, customers in emerging automotive markets are familiar with the operation of MTs, but there is increasing demand for a transmission that offers the benefits of ATs at costs that are closer to those of MTs. These customers are also most likely to drive in highly populated cities where stop-and-go conditions exist. Accordingly, there exists a need for a low-cost transmission configuration that combines the benefits of MTs with those of ATs.

SUMMARY

This section provides a general summary of the disclosure, and is not a comprehensive disclosure of its full scope or all of its features.

A power transmitting device for a vehicle having a power plant and a drivetrain is provided. The power transmitting device includes an output shaft that provides torque to the drivetrain and a manual transmission that is selectable between a first gear set having a first gear ratio and a second gear set having a second gear ratio. The first gear set and second gear set of the manual transmission can each transmit power to the output shaft at different rotational speeds. The power transmitting device also includes a hydraulic torque converter that multiplies torque. Torque is multiplied through the torque converter and is transmitted to the output shaft from the torque converter when the first gear set is selected and is not multiplied through the torque converter when the second gear set is selected.

In another configuration, a power transmitting device for a vehicle having a power plant and a drivetrain is provided. The power transmitting device includes an output member, a first gear set having a first gear ratio, a second gear set having a second gear ratio, and a gear shifter movable between a first position causing the first gear set to rotationally drive the output member and a second position causing the second gear set to rotationally drive the output member. The power transmitting device also includes a hydraulic torque converter that multiplies torque when the gear selector is in the first position, but does not multiply torque when the gear selector is in the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-4, a powertrain 10 for a vehicle (not shown) is illustrated. The vehicle can be any type of vehicle, such as, for example, an automobile, truck, or agricultural machine. The powertrain 10 generally includes a power plant 14, an input power member 18, a clutch 22, an output power member 26, a torque converter unit ("TC unit") 30, a manual transmission unit 34, and a drive unit 38.

The power plant 14 can be any type of power-generating device that generates rotational motion such as, for example, an internal combustion engine or electric motor. The power plant 14 is coupled to the input power member 18 to rotationally drive the input power member 18. The input power member 18 is coupled to the output power member 26 by the clutch 22. The clutch 22 can be any type of clutch such as a dry or wet friction clutch, for example, and can be a single or multiple-plate clutch. In the example provided, the clutch 22 is a dry clutch that can selectively couple and decouple the input power member 18 with the output power member 26 when a clutch actuator 40 is activated or deactivated.

When the input power member 18 and output power member 26 are coupled, the input power member 18 transfers rotational power to the output power member 26. When decoupled, the output power member 26 does not receive rotational power from the input power member 18. The clutch actuator 40 can be activated or deactivated by the operator. For example, the operator can activate or deactivate the clutch actuator 40 by engaging or disengaging a clutch pedal (not shown) of the vehicle. The output power member 26 can transfer rotational power to either the TC unit 30 or the transmission unit 34 to transfer rotational power to the drive unit 38, as will be described below.

Figure 3:
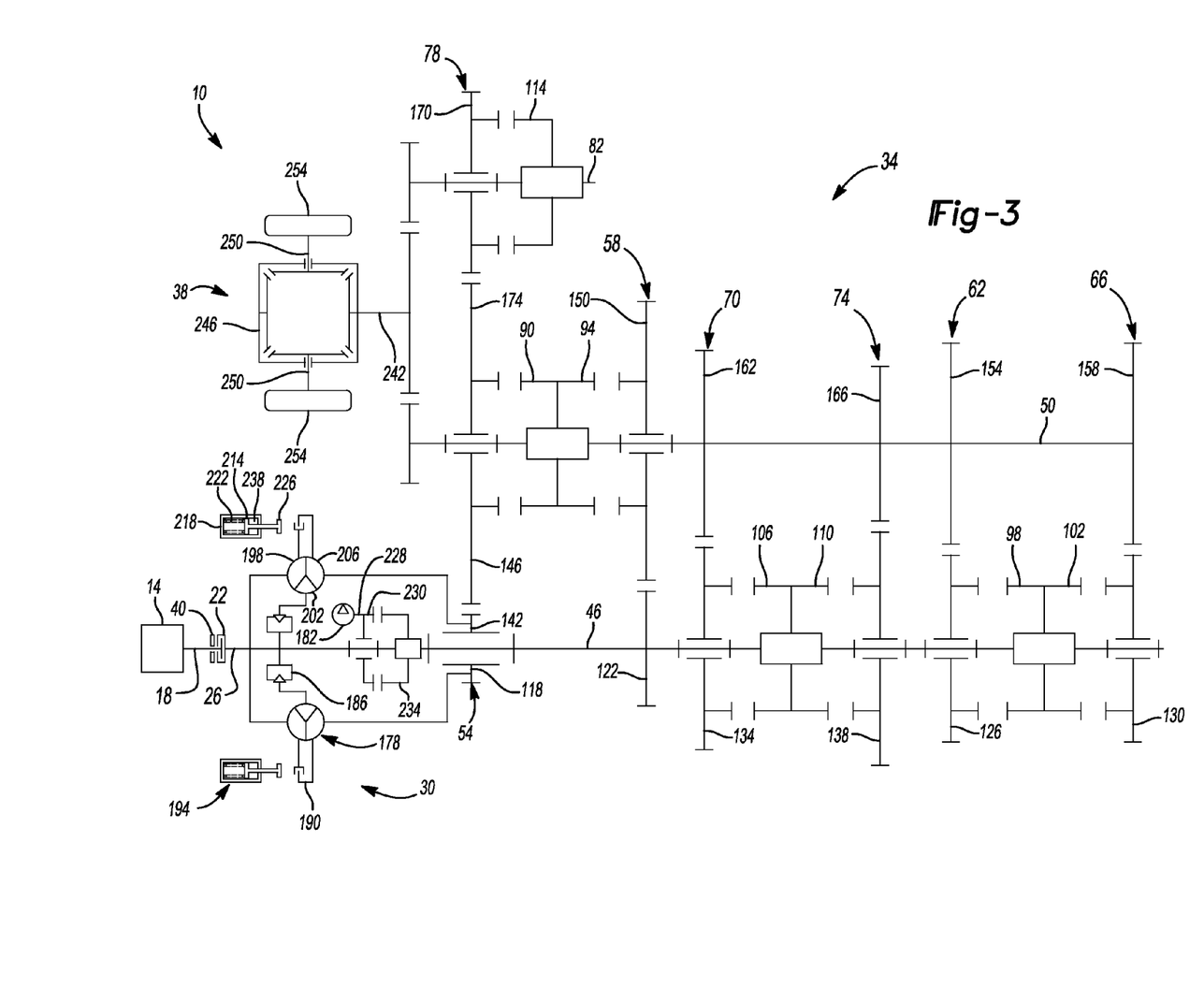
FIG. 3 is a schematic diagram of another exemplary manual transmission with a torque converter constructed in accordance with the teachings of the present application.
Figure 4:
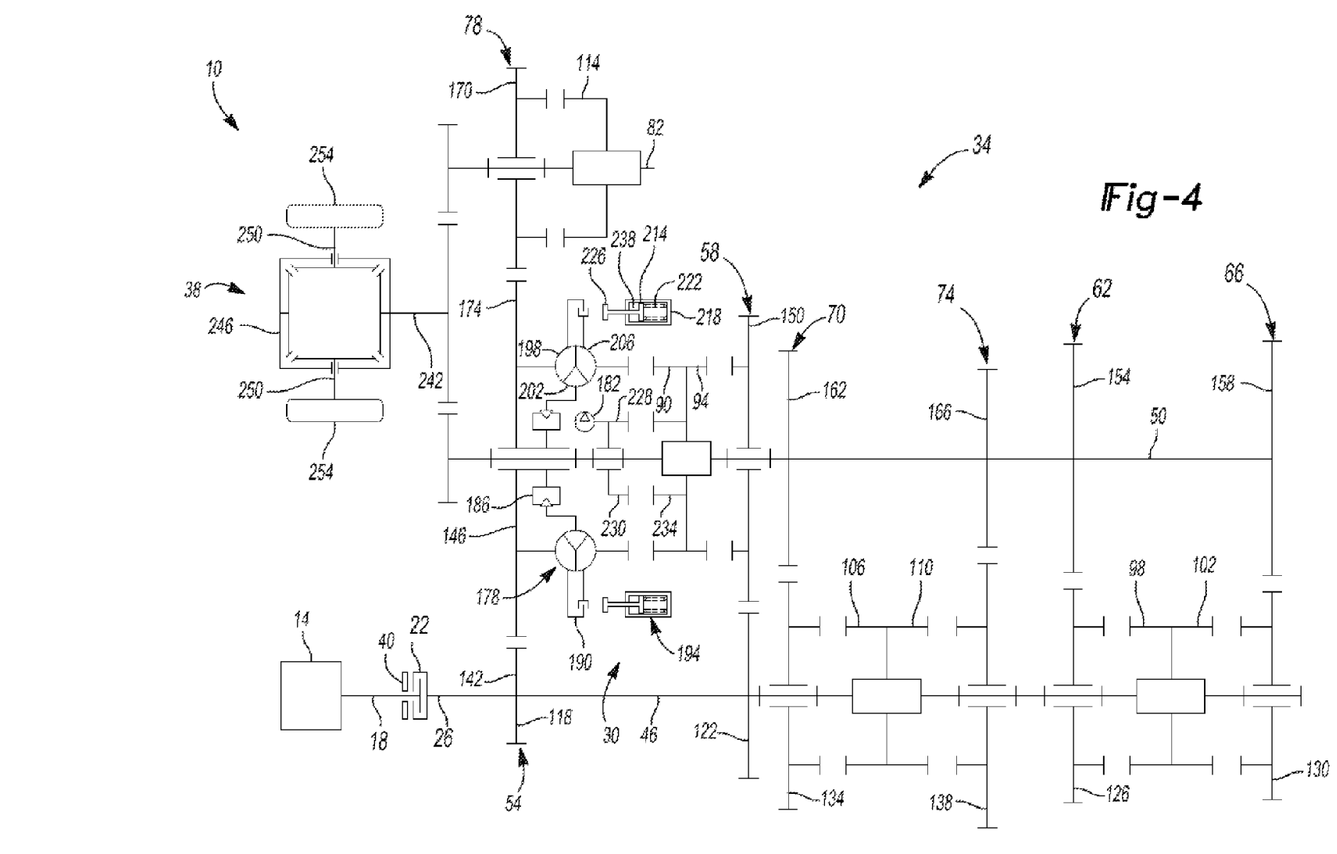
FIG. 4 is a schematic view of a manual transmission with a torque converter in a fourth configuration in accordance with the present disclosure.

The transmission unit 34 includes a manual selector 42, an input member 46, an output member 50, and at least a first gear set 54 and a second gear set 58. The transmission unit 34 can include additional gear sets, such as a third gear set 62, a fourth gear set 66, a fifth gear set 70, a sixth gear set 74 (fourth through sixth gear sets are shown in FIGS. 3 and 4), and a reverse gear set 78. The transmission unit 34 can also include a reverse output member 82 (shown in FIGS. 3 and 4). It is understood that the transmission unit 34 can include any number of synchronizers (not shown) to synchronize the rotation of various elements.

The gear sets 54, 58, 62, 66, 70, 74, 78 transfer torque from the input member 46 to the output member 50 or reverse output member 82, to transmit the torque to the drive unit 38. The gear sets 54, 58, 62, 66, 70, 74, 78 can have different gear ratios to drive the drive unit 38 at different torques or speeds. The reverse gear set 78 drives the drive unit 38 in a rotational direction opposite the rotational direction driven by the other gear sets 54, 58, 62, 66, 70, 74. The first through sixth gear sets 54, 58, 62, 66, 70, 74 can be forward gears to operate the vehicle in a forward direction, while the reverse gear set 78 operates the vehicle in a reverse direction. It is understood that additional or fewer forward or reverse gear sets or gear ratios can be used. The gear ratios can increase from lowest to highest, such that the first gear ratio is the lowest gear ratio, while the sixth gear ratio is the highest.

The manual selector 42 can include a shifter 86 (shown in FIGS. 1 and 2) and first, second, third, fourth, fifth, sixth, and reverse gear selectors 90, 94, 98, 102, 106, 110, 114 (fourth through sixth gear selectors shown in FIGS. 3 and 4). The shifter 86 is coupled to the gear selectors 90, 94, 98, 102, 106, 110, 114, and can be any type of shifter that can be manually moved by the vehicle operator to select between gear sets such as a floor-mounted shifter, an H-pattern shifter, or a shift knob shifter, for example.

The gear sets 54, 58, 62, 66, 70, 74, 78 are manually selected by the operator by moving the shifter 86 between first, second, third, fourth, fifth, sixth, or reverse positions. The TC unit 30 can act to multiply torque when the first gear set 54 is selected to provide easier stop-and-go or low-speed vehicle operation while the operator can manually select higher gear ratios at higher vehicle speeds. Additionally, the TC unit 30 can act to multiply torque when the reverse gear set 78 is selected to ease reverse vehicle operation. The first, second, third, fourth, fifth, sixth, and reverse gear sets 54, 58, 62, 66, 70, 74, 78 can have first, second, third, fourth, fifth, sixth, and reverse input gears 118, 122, 126, 130, 134, 138, 142 (fourth through sixth input gears shown in FIGS. 3 and 4) and first, second, third, fourth, fifth, sixth, and reverse output gears 146, 150, 154, 158, 162, 166, 170

(fourth through sixth output gears shown in FIGS. 3 and 4). The reverse gear set 78 can also have an idler gear 174. The idler gear 174 reverses the direction of rotation of the reverse output gear 170 and thus the output member 50 relative to the direction of rotation of the reverse input gear 142 and the input member 46 when the reverse gear selector 114 is engaged.

Figure 1:
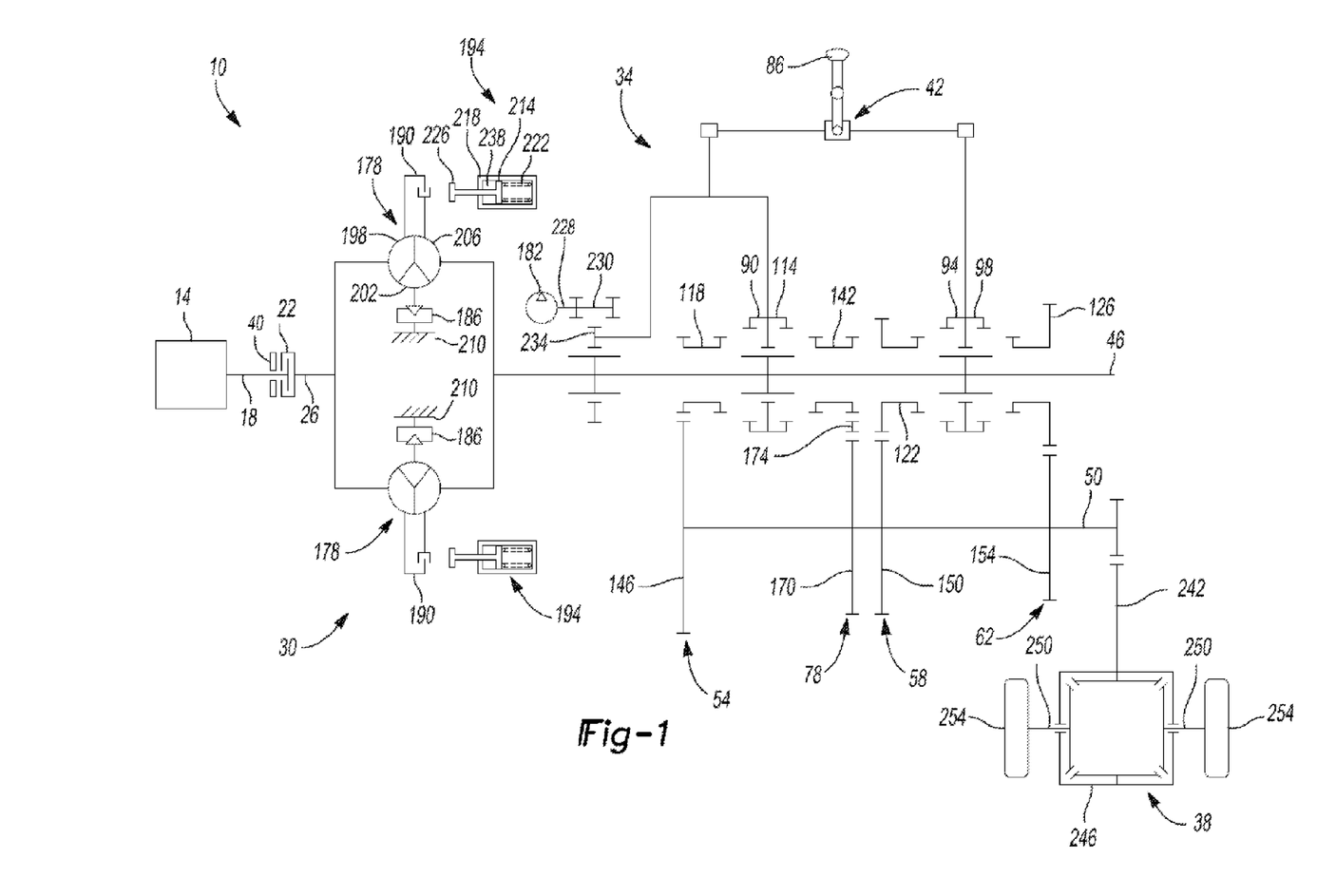
FIG. 1 is a schematic diagram of an exemplary manual transmission with a torque converter constructed in accordance with the teachings of the present application.
Figure 2:
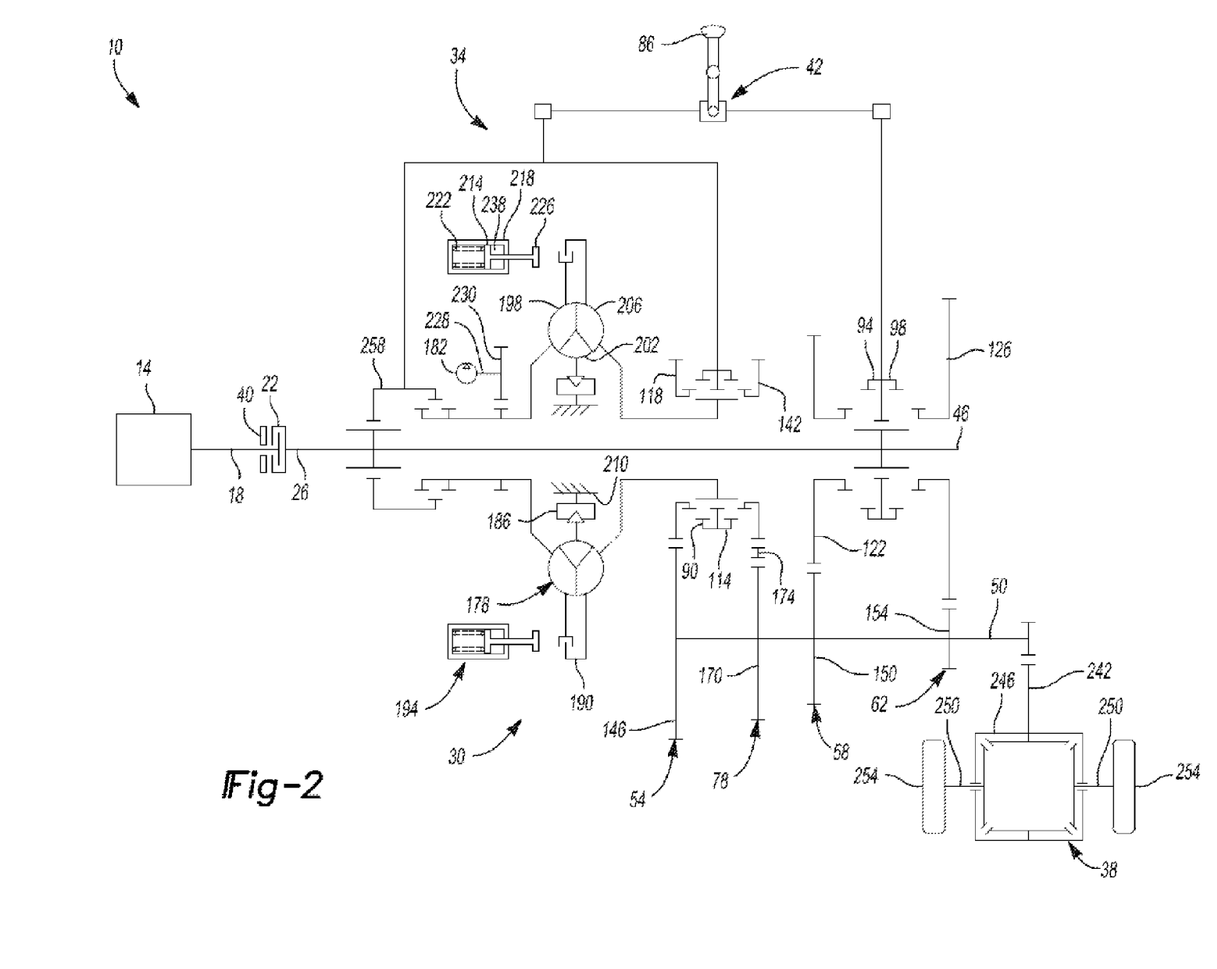
FIG. 2 is a schematic diagram of another exemplary manual transmission with a torque converter constructed in accordance with the teachings of the present application.

The TC unit 30 includes a hydraulic torque converter ("TC") 178 and a pump 182. The TC unit 30 can further include a one-way or overrunning clutch 186, and may include an optional lock-up clutch 190 and a lock-up actuator 194. The TC 178 includes an impeller 198, a stator 202, and a turbine 206. The stator 202 can be coupled to a rotationally stationary element 210 (as shown in FIGS. 1 and 2) or can be coupled to a rotational element such as the input member 46 (as shown in FIG. 3), or the output member 50 (as shown in FIG. 4), via the one-way clutch 186. While shown coupled to stationary element 210, the stator 202 shown in FIGS. 1 and 2 can alternatively be coupled to a rotational element, such as the input member 46 or the output member 50 via the one-way clutch 186. While shown coupled to a rotational element, the stator 202 shown in FIGS. 3 and 4 can alternatively be coupled to stationary element 210. The one-way clutch 186 can also be located between the stator 202 and the stationary element 210. The one-way clutch 186 prevents the stator 202 from rotating opposite the impeller 198 while allowing the stator 202 to rotate in the same direction as the impeller 198.

The lock-up clutch 190 can be any type of clutch such as a wet-friction clutch, a dry-friction clutch, or a dog clutch, for example, to rotationally fix the turbine 206 to the impeller 198. The lock-up clutch 190 can be disengaged to allow the impeller 198 and the turbine 206 to rotate independent of one another such that the TC 178 operates to multiply torque. The lock-up clutch 190 can be engaged to rotationally lock the impeller 198 with the turbine 206 such that the impeller 198 and turbine 206 rotate at the same speed and torque. The lock-up clutch 190 can be moved between the engaged and disengaged position by the lock-up actuator 194.

The lock-up actuator 194 can be any type of actuator to move the lock-up clutch 190 into and out of engagement, such as a hydraulic, electrical, or mechanical actuator, for example. In the examples provided, the lock-up actuator 194 is a hydraulic-type actuator having a piston 214, a cylinder 218, a biasing member 222, and an actuating member 226. The piston 214 is disposed within the cylinder 218 and is coupled to the actuating member 226. The actuating member 226 moves the lock-up clutch 190 between the engaged position and the disengaged position. The biasing member 222 biases the actuating member 226 toward the engaged position and can be any type of biasing member. In the examples provided, the biasing member 222 is a spring disposed within the cylinder 218 that biases the piston 214 and, thus, the actuating member 226 toward the engaged position.

The pump 182 is coupled to a pump input member 228 that provides rotational power to operate the pump 182. The pump input member 228 can be coupled to a pump gear 230. The transmission unit 34 can further include a pump gear selector 234 that selectively engages or disengages the pump gear 230 to selectively operate the pump 182. The pump 182 can alternatively provide rotational power by other means such as an electric motor (not shown), for example. The pump 182 can be coupled to a reservoir (not shown) that stores hydraulic fluid and pumps the fluid to the TC 178 via a TC supply line (not shown), which, in turn, provides the fluid to the impeller 198. A TC return line (not shown) can allow the fluid to return to the reservoir after passing through the turbine 206. The flow of fluid can provide cooling for the TC 178.

The pump 182 can be coupled to an actuator supply line (not shown) to pump fluid into a chamber 238 within the cylinder 218 of the lock-up actuator 194. When fluid is pumped into the chamber 238, the fluid acts on the piston 214 to overcome the biasing member 222 and moves the piston 214 and actuating member 226 from the engaged position to the disengaged position. The chamber 238 can be coupled to the reservoir by an actuator return line (not shown) that releases fluid from the chamber 238 to the reservoir. The actuator return line bleeds fluid from the chamber 238 at a flow rate less than the flow rate of the pump 182 such that the piston 214 remains in the disengaged position when the pump 182 is providing fluid to the chamber 238, and the piston 214 moves to the engaged position when fluid is not provided to the chamber 238. Valves (not shown) could alternatively or additionally be used to selectively allow and prevent fluid from draining from the chamber 238 to the reservoir.

The output member 50 is coupled to the drive unit 38 to provide rotational power thereto. Likewise, the reverse output member 82 is coupled to the drive unit 38 to provide rotational power thereto in an opposite rotational direction than provided by the output member 50. The drive unit 38 can include a drive shaft 242, a differential 246, and a pair of drive axles 250. The drive shaft 242 can be coupled to the output member 50 and can be coupled to the reverse output member 82 to receive rotational power therefrom. The drive shaft 242 transfers rotational power to the differential 246 which, in turn, transfers rotational power to the drive axles 250. The drive axles 250 are coupled to wheels 254 for providing rotational power thereto.

With reference to FIG. 1, the TC unit 30 and transmission unit 34 are connected in series such that power is transferred from the output power member 26 to the TC unit 30 and from the TC unit 30 to the transmission unit 34. In the example provided, the transmission unit 34 includes the first, second, third, and reverse gear sets 54, 58, 62, 78. The transmission unit 34 transfers power to the drive unit 38. In the present example, the TC unit 30 includes the one-way clutch 186, the lock-up clutch 190, and the lock-up actuator 194, though understood to be optional. The one-way clutch 186 can couple the stator 202 to the stationary element 210, though it is understood that the one-way clutch 186 can couple the stator 202 to a rotational element such as the input member 46, for example. The impeller 198 is rotationally driven by the output power member 26. In the present example, the impeller 198 is fixed to the output power member 26 for rotation therewith. It is understood that the impeller 198 can alternatively be meshingly engaged to the output power member 26 to cause a reduction or increase of rotational speed, and/or reversal of rotational direction. The turbine 206 is coupled to the transmission unit 34, as will be described below. While schematically shown with the impeller 198 proximate to the clutch 22, it is understood that the turbine 206 can be physically located between the clutch 22 and the impeller 198. The pump 182 can be coupled to the pump gear 230 such that the pump 182 only provides fluid during selection of certain gear sets.

The input member 46 of the transmission unit 34 is coupled to the turbine 206 and rotationally driven by the turbine 206. In the present example, the turbine 206 is fixed to the input member 46 for rotation therewith. It is understood that the turbine 206 can alternatively be meshingly engaged to the input member 46 to cause a reduction or increase of rotational speed, and/or reversal of rotational direction. Thus, rotational power flows from the output power member 26, through the TC 178, and to the input member 46. When the manual selector 42 is in the first or reverse position, the lock-up clutch 190 is disengaged. In the second or third position, the lock-up clutch 190 is engaged. Thus, the TC 178 acts to multiply torque in the first and reverse ratios while the operator can manually select higher gear ratios at higher vehicle speeds without suffering hydraulic losses from the TC 178.

The first, second, third, and reverse input gears 118, 122, 126, 142 can be rotatably coupled to the input member 46 to freely rotate thereon. The first, second, third, and reverse output gears 146, 150, 154, 170 can be fixed for rotation with the output member 50. For the first, second, and third gear sets 54, 58, 62, each input gear 118, 122, 126 can be meshingly engaged with the respective output gear 146, 150, 154. For the reverse gear set 78, the idler gear 174 can mounted between the reverse input gear 142 and the reverse output gear 170. The idler gear 174 can be meshingly engaged with the reverse input gear 142 and the reverse output gear 170 to drive the reverse output gear 170 to rotate the output member 50 in the opposite rotational direction as driven by the first, second, and third gear sets 54, 58, 62. It is understood that, alternatively, the first, second, third, and reverse input gears 118, 122, 126, 142 can be fixed for rotation with the input member 46 and the first, second, third, and reverse output gears 146, 150, 154, 170 can be coupled to the output member 50 to freely rotate thereon.

In the present example, the manual selector 42 includes the first, second, third, and reverse gear selectors 90, 94, 98, 114. The gear selectors 90, 94, 98, 114 can be coupled for rotation with the input member 46 while being axially movable along the input member 46. For example, the gear selectors 90, 94, 98, 114 can be meshingly engaged with the input member 46 while being axially movable thereon and maintaining engagement therewith. The first gear selector 90 can be coupled for axial movement along the input member 46 with the reverse gear selector 114, and the second gear selector 94 can be coupled for axial movement along the input member 46 with the third gear selector 98, though other configurations can be used. In the present example, the manual selector 42 can also include the pump gear selector 234. The pump gear selector 234 can also be coupled for rotation with the input member 46 while being axially movable along the input member 46. For example, the pump gear selector 234 can be meshingly engaged with the input member 46 while being axially movable thereon and maintaining engagement therewith.

When the shifter 86 is moved to the first position, the shifter 86 moves the first gear selector 90 into engagement with the first input gear 118 and the input member 46 to provide rotational power from the input member 46 to the first gear set 54. When the shifter 86 is moved to the second position, the shifter moves the second gear selector 94 into engagement with the second input gear 122 and the input member 46 to provide rotational power from the input member 46, to the second gear set 58. When the shifter 86 is moved to the third position, the shifter 86 moves the third gear selector 98 into engagement with the third input gear 126 and the input member 46, to provide rotational power from the input member 46 to the third gear set 62. When the shifter 86 is moved to the reverse position, the shifter 86 moves the reverse gear selector 114 into engagement with the reverse input gear 142 and the input member 46 to provide rotational power from the input member 46 to the reverse gear set 78. When any one of the first, second, third, and reverse gear sets 54, 58, 62, 78 is engaged, the remaining gear sets are disengaged.

The shifter 86 can also move the pump gear selector 234 into engagement with the pump gear 230 and the input member 46 to operate the pump 182 when either of the first gear set 54 or the reverse gear set 78 is selected by moving the shifter to the first or reverse positions. When either of the second, or third gear sets 58, 62 is selected, the pump gear selector 234 can be disengaged from the pump gear 230 or the input member 46 to cease providing rotational power to the pump 182. In the example provided, the shifter 86 is illustrated in a neutral position in which none of the gear sets 54, 58, 62, 78, nor the pump 182, are engaged.

With reference to FIG. 2, a second configuration is illustrated in which the transmission unit 34 includes the first, second, third, and reverse gear sets 54, 58, 62, 78. In this configuration, the TC unit 30 and transmission unit 34 are connected in parallel such that power is transferred through the TC unit 30 only when either of the first or reverse gear sets 54, 78 is selected. The output power member 26 is coupled to the input member 46 of the transmission unit 34 to rotationally drive the input member 46. Power is transferred from the input member 46 to the TC unit 30 only when either of the first or reverse gear sets 54, 78 is selected. The TC unit 30 multiplies the torque when either of the first or reverse gear sets 54, 78 is selected and the first or reverse gear set 54, 78 transfers power to the output member 50. When the second or third gear sets 58, 62 are selected, the input member 46 transfers power to the output member 50 through the second or third gear sets 58, 62 without transferring power to the TC unit 30. The output member 50 transfers power to the drive unit 38.

In the present example, the TC unit 30 can include the one-way clutch 186, the lock-up clutch 190, and the lock-up actuator 194, though understood to be optional. The one-way clutch 186 can couple the stator 202 to the stationary element 210, though it is understood that the one-way clutch 186 can couple the stator 202 to a rotational element such as the input member 46, for example. The impeller 198 can selectively receive input torque from the input member 46 while the turbine 206 can selectively provide output torque to the first or reverse input gears 118, 142, as will be described below. The pump 182 can be coupled to the pump gear 230 such that the pump 182 only provides fluid during selection of certain gear sets.

The first, second, third, and reverse input gears 118, 122, 126, and 142 can be rotatably coupled to the input member 46 to freely rotate thereon. The first, second, third, and reverse output gears 146, 150, 154, 170 can be fixed for rotation with the output member 50. For the first, second and third gear sets 54, 58, 62, each input gear 118, 122, 126 can be meshingly engaged with the respective output gear 146, 150, 154. For the reverse gear set 78, the idler gear 174 can be mounted between the reverse input gear 142 and the reverse output gear 170 and can be meshingly engaged with the reverse input gear 142 and the reverse output gear 170. It is understood that, alternatively, the second, and third input gears 122, 126 can be fixed for rotation with the input member 46 and the second, and third output gears 150, 154 can be coupled to the output member 50 to freely rotate thereon.

In the present example, the manual selector 42 includes the first, second, third, and reverse gear selectors 90, 94, 98, 114. The manual selector 42 can further include a torque converter selector ("TC selector") 258. The first gear selector 90 can be coupled to the reverse gear selector 114 and can be coupled for rotation with the turbine 206 while being axially movable thereon. For example, the first and reverse gear selectors 90, 114 can be meshingly engaged to the turbine 206 and axially movable thereon. The second gear selector 94 can be coupled to the third gear selector 98 and can be coupled for rotation with the input member 46 while being axially movable along the input member 46. For example, the second and third gear selector 94, 98 can be meshingly engaged to the input member 46, and axially movable thereon. The TC selector 258 can be coupled for rotation with the input member 46 while being axially movable along the input member 46. For example, the TC selector 258 can be meshingly engaged to the input member 46, and axially movable thereon.

When the shifter 86 is moved to the first position, the shifter 86 moves the first gear selector 90 into engagement with the first input gear 118 and moves the TC selector 258 into engagement with the impeller 198 to transfer rotational power through the TC unit 30 and from the turbine 206 to the first input gear 118 to drive the first output gear 146. When the shifter 86 is moved to the second position, the shifter 86 moves the second gear selector 94 into engagement with the second input gear 122 and the input member 46 to provide rotational power from the input member 46 to the second gear set 58. When the shifter 86 is moved to the third position, the shifter 86 moves the third gear selector 98 into engagement with the third input gear 126 and the input member 46 to provide rotational power from the input member 46 to the third gear set 62. When the shifter 86 is moved to the reverse position, the shifter 86 moves the reverse gear selector 114 into engagement with the reverse input gear 142 and moves the TC selector 258 into engagement with the impeller 198 to transfer rotational power through the TC unit 30 and from the turbine 206 to the reverse input gear 142 to drive the idler gear 174, which drives the reverse output gear 170 to rotate the output member 50 in the opposite rotational direction as driven by the first, second, and third gear sets 54, 58, 62. When the shifter 86 is in the first or reverse position, the TC selector 258 can engage the impeller 198 with the input member 46 to provide rotational power from the input member 46 to the impeller 198. When any one of the first, second, third, and reverse gear sets 54, 58, 62, 78 is engaged, the remaining gear sets are disengaged.

The pump gear 230 can be coupled to the impeller 198 for rotation therewith to operate the pump 182 when the impeller 198 rotates. For example, the pump gear 230 can be meshingly engaged with the impeller 198. Thus, the pump 182 can be operated when either of the first gear set 54 or the reverse gear set 78 is selected by moving the shifter 86 to the first or reverse positions while the pump 182 does not receive rotational power when the shifter 86 is moved to the second or third positions. When the pump 182 is operating, fluid can be provided to the lock-up actuator 194 to disengage the lock-up clutch 190 when the first or reverse gear sets 54, 78 are selected. The operator can also selectively cutoff fluid from the lock-up actuator 194 to selectively engage the lock-up clutch 190 while the first or reverse gear sets 54, 78 are selected. In the present example, the manual selector 42 is illustrated in a neutral position such that none of the gear sets 54, 58, 62, 78 is selected, nor is the TC selector 258 engaged with the impeller 198 to drive the pump 182. It should also be appreciated that the lock-up clutch 190 and the actuator 194 may be eliminated from the configuration illustrated in FIG. 2. When the TC selector 258 is disengaged, the TC unit 30 is disconnected from the output power member 26 so the hydraulic drag related losses associated with the TC unit 30 are isolated from the rest of the powertrain 10. Accordingly, there is no need for the lock-up clutch 190 and the actuator 194 to reduce hydraulic drag related losses in the TC unit 30 when the TC selector 258 is disengaged. However, the lock-up clutch 190 and the actuator 194 may optionally be included in the transmission unit 34 to reduce hydraulic drag related losses in the TC unit 30 when the TC selector 258 is engaged, such as when the shifter 86 is in the first or reverse position.

With regard to FIG. 3, a third configuration is illustrated in which the transmission unit 34 includes the first, second, third, fourth, fifth, sixth, and reverse gear sets 54, 58, 62, 66, 70, 74, 78. The transmission unit 34 also includes the reverse output member 82, as will be described below. In this configuration, the TC unit 30 and transmission unit 34 are connected in parallel such that power is transferred through the TC unit 30 to the output member 50 or reverse output member 82 only when the first or reverse gear sets 54, 78 are respectively selected.

The output power member 26 can be coupled to the input member 46 to rotationally drive the input member 46. The input member 46 can be coupled to the stator 202 by the one-way clutch 186 to allow the stator 202 to rotate in the same direction as the input member 46 while preventing rotation of the stator 202 in the opposite direction. The input member 46 can be coupled to the impeller 198 to rotationally drive the impeller 198. The turbine 206 can be coupled to the first input gear 118 to rotationally drive the first input gear 118. The lock-up clutch 190 can be optionally included to selectively lock the impeller 198 to the turbine 206 to reduce hydraulic drag losses between the impeller 198 and the turbine 206. The lock-up clutch 190 can be engaged when the second through sixth gear sets 58, 62, 66, 70, 74 are selected or when the pump 182 is not operating.

The pump 182 can be coupled to the input member 46 such that rotation of the input member 46 operates the pump 182. The pump gear 230 can be coupled to the input member 46 to freely rotate thereon. The pump gear selector 234 can be coupled for rotation with the input member 46 while being axially movable along the input member 46. For example, the pump gear selector 234 can meshingly engage the input member 46 while being axially movable thereon, while maintaining engagement therewith. The pump gear selector 234 can be selectively moved between an engaged position to couple the pump gear 230 with the input member 46 for rotation therewith and a disengaged position where the pump gear 230 is not rotationally driven by the input member 46. By moving the pump gear selector between the engaged and disengaged positions, the pump 182 can be selectively operated. The pump gear selector 234 can be moved from the disengaged position to the engaged position when the input member 46 and the first input gear 118 rotate at different velocities. The pump gear selector 234 can be moved into and out of engagement by the shifter (not shown) or any other type of actuating mechanism, such as a hydraulic, electrical, or mechanical actuator, for example. The pump gear selector 234 can be moved into engagement when the shifter is moved to the first position and moved out of engagement when the shifter is moved out of the first position, such that the pump 182 operates when the first gear set 54 is selected, as will be described below. The pump gear selector 234 can be moved into engagement when the shifter is moved to the reverse position and moved out of engagement when the shifter is moved out of the reverse position, such that the pump 182 operates when the reverse gear set 78 is selected, as will be described below.

The first input gear 118 can be rotationally coupled to the input member 46 to be freely rotatable thereon. The second input gear 122 can be fixed for rotation with the input member 46. The third, fourth, fifth, and sixth input gears 126, 130, 134, 138 can be coupled to the input member 46 to be freely rotatable thereon. The first input gear 118 also acts as the reverse input gear 142 when the reverse position is selected. The first and second output gears 146, 150 can be coupled to the output member 50 to be freely rotatable thereon. The third, fourth, fifth, and sixth output gears 154, 158, 162, 166 can be fixed for rotation with the output member 50. The reverse output gear 170 can be coupled to the reverse output member 82 to be freely rotatable thereon. Each of the forward input gears 118, 122, 126, 130, 134, 138 can be meshingly engaged with the respective forward output gear 146, 150, 154, 158, 162, 166 to transfer rotational power therebetween. The first output gear 146 can also be meshingly engaged with the reverse output gear 170 such that the first output gear 146 acts as the idler gear 174 for the reverse gear set 78.

The first and second gear selectors 90, 94 can be coupled to rotate with the output member 50 and are movable between engaged and disengaged positions relative to the first and second output gears 146, 150. The first and second gear selectors 90, 94 can be coupled together and can be coupled for rotation with the output member 50 while being axially movable along the output member 50. For example, the first and second gear selectors 90, 94 can meshingly engage with the output member 50 while being axially movable thereon, while maintaining engagement therewith. The third, fourth, fifth, and sixth gear selectors 98, 102, 106, 110 can be coupled to rotate with the input member 46 and movable between engaged and disengaged positions relative to the third, fourth, fifth, and sixth input gears 126, 130, 134, 138. The third and fourth gear selectors 98, 102 can be coupled together and can be coupled for rotation with the input member 46 while being axially movable along the input member 46. For example, the third and fourth gear selectors 98, 102 can meshingly engage the input member 46 while being axially movable thereon. The fifth and sixth gear selectors 106, 110 can be coupled together and can be coupled for rotation with the input member 46 while being axially movable along the input member 46. For example, the fifth and sixth gear selectors 106, 110 can meshingly engage the input member 46 while being axially movable thereon. The reverse gear selector 114 can be coupled to rotate with the reverse output member 82 and movable between engaged and disengaged positions relative to the reverse output gear 170. For example, the reverse gear selector 114 can be meshingly engaged with the reverse output member 82 while being axially movable along the input member 46.

When the shifter (not shown) is moved to the first position, the pump gear selector 234 can be moved into engagement such that the lock-up clutch 190 is disengaged, and the first gear selector 90 can engage the first output gear 146 to transfer rotational power from the first output gear 146 to the output member 50. When the shifter is moved to the second position, the second gear selector 94 can engage the second output gear 150 to transfer rotational power from the second output gear 150 to the output member 50. When the shifter is moved to the third, fourth, fifth, or sixth position, the third, fourth, fifth, or sixth gear selector 98, 102, 106, 110, respectively, can engage the third, fourth, fifth, or sixth input gear 126, 130, 134, 138 to transfer rotational power from the input member 46 to the respective input gear 126, 130, 134, 138, which transfers power to the respective output gear 154, 158, 162, 166, and thus to the output member 50. When the shifter is moved to the reverse position, the pump gear selector 234 can be moved into engagement such that the lock-up clutch 190 is disengaged, and the reverse gear selector 114 can engage the reverse output gear 170 to transfer rotational power from the reverse output gear 170 to the reverse output member 82. The drive shaft 242 can be coupled to the reverse output member 82 to receive rotational power therefrom (not shown).

With regard to FIG. 4, a fourth configuration is illustrated in which the transmission unit 34 includes the first, second, third, fourth, fifth, sixth, and reverse gear sets 54, 58, 62, 66, 70, 74, 78. The transmission unit 34 also includes the reverse output member 82, as will be described below. In this configuration, the TC unit 30 and transmission unit 34 are connected in parallel such that power is transferred through the TC unit 30 to the output member 50 only when the first gear set 54 is selected.

The output power member 26 can be coupled to the input member 46 to rotationally drive the input member 46. The first and second input gears 118, 122 can be fixed for rotation with the input member 46. The third, fourth, fifth, and sixth input gears 126, 130, 134, 138 can be rotatably coupled to the input member 46 to freely rotate thereon. The first input gear 118 also acts as the reverse input gear 142 when the reverse position is selected.

The first and second output gears 146, 150 can be rotatably coupled to the output member 50 to freely rotate thereon. The third, fourth, fifth, and sixth output gears 154, 158, 162, 166 can be fixed for rotation with the output member 50. The reverse output gear 170 can be coupled to the reverse output member 82 to be freely rotatable thereon. Each of the forward input gears 118, 122, 126, 130, 134, 138 can be meshingly engaged with the respective forward output gear 146, 150, 154, 158, 162, 166 to transfer rotational power therebetween. The first output gear 146 also acts as the idler gear 174 in the reverse gear set 78. The idler gear 174 can be meshingly engaged with the reverse output gear 170.

The TC unit 30 can be disposed about the output member 50. The stator 202 can be coupled to the output member 50 by the one-way clutch 186 to allow the stator 202 to rotate in the same direction as the output member 50 while preventing rotation of the stator 202 in the opposite direction. The impeller 198 can be fixed for rotation with the first output gear 146 to rotationally drive the impeller 198. The lock-up clutch 190 can be optionally included to selectively lock the impeller 198 to the turbine 206 to reduce hydraulic drag losses between the impeller 198 and the turbine 206. The lock-up clutch 190 can be engaged when the second through sixth gear sets 58, 62, 66, 70, 74 are selected or when the pump 182 is not operating.

The pump 182 can be coupled to the output member 50 such that rotation of the output member 50 operates the pump 182. The pump gear 230 can be coupled to the output member 50 to freely rotate thereon. The pump gear selector 234 can be coupled for rotation with the output member 50 while being axially movable along the output member 50. For example, the pump gear selector 234 can be meshingly engaged with the output member 50 while being axially movable thereon. The pump gear selector 234 can be selectively moved between an engaged position to couple the pump gear 230 with the output member 50 for rotation therewith and a disengaged position where the pump gear 230 is not rotationally driven by the output member 50. By moving the pump gear selector 234 between the engaged and disengaged positions, the pump 182 can be selectively operated. The pump gear selector 234 can be moved into and out of engagement by the shifter (not shown) or by any other type of actuating mechanism such as a hydraulic, electrical, or mechanical actuator, for example. The pump gear selector 234 can be coupled to the first gear selector 90 to be moved between the engaged and disengaged positions when the first gear set 54 is selected.

The first and second gear selectors 90, 94 can be coupled to rotate with the output member 50 and are movable between engaged and disengaged positions relative to the turbine 206 and the second output gear 150. The first and second gear selectors 90, 94 can be coupled together and are coupled for rotation with the output member 50 while being axially movable along the output member 50. For example, the first and second gear selectors 90, 94 can be meshingly engaged with the output member 50, while being axially movable thereon. The third, fourth, fifth, and sixth gear selectors 98, 102, 106, 110 can be coupled to rotate with the input member 46 and are movable between engaged and disengaged positions relative to the third, fourth, fifth, and sixth input gears 126, 130, 134, 138. The third and fourth gear selectors 98, 102 can be coupled together and are coupled for rotation with the input member 46 while being axially movable along the input member 46. For example the third and fourth gear selectors 98, 102 can be meshingly engaged with the input member 46, while being axially movable thereon. The fifth and sixth gear selectors 106, 110 can be coupled together and are coupled for rotation with the input member 46 while being axially movable along the input member 46. For example the fifth and sixth gear selectors 106, 110 can be meshingly engaged with the input member 46, while being axially movable thereon. The reverse gear selector 114 can be coupled to rotate with the reverse output member 82 and is movable between engaged and disengaged positions relative to the reverse output gear 170. For example, the reverse gear selector 114 can be meshingly engaged with the reverse output member 82 while being axially movable along the input member 46.

When the shifter (not shown) is moved to the first position, the first gear selector 90 can engage the turbine 206 to transfer rotational power from the turbine 206 to the output member 50. When the shifter is moved to the second position, the second gear selector 94 can engage the second output gear 150 to transfer rotational power from the second output gear 150 to the output member 50. When the shifter is moved to the third, fourth, fifth, or sixth position, the third, fourth, fifth, or sixth gear selector 98, 102, 106, 110, respectively, can engage the third, fourth, fifth, or sixth input gear 126, 130, 134, 138 to transfer rotational power from the input member 46 to the respective input gear 126, 130, 134, 138, which transfers power to the respective output gear 154, 158, 162, 166, and thus to the output member 50. When the shifter is moved to the reverse position, the reverse gear selector 114 can engage the reverse output gear 170 to transfer rotational power from the reverse output gear 170 to the reverse output member 82. The drive shaft 242 can be coupled to the reverse output member 82 to receive rotational power therefrom.

Figure 5:
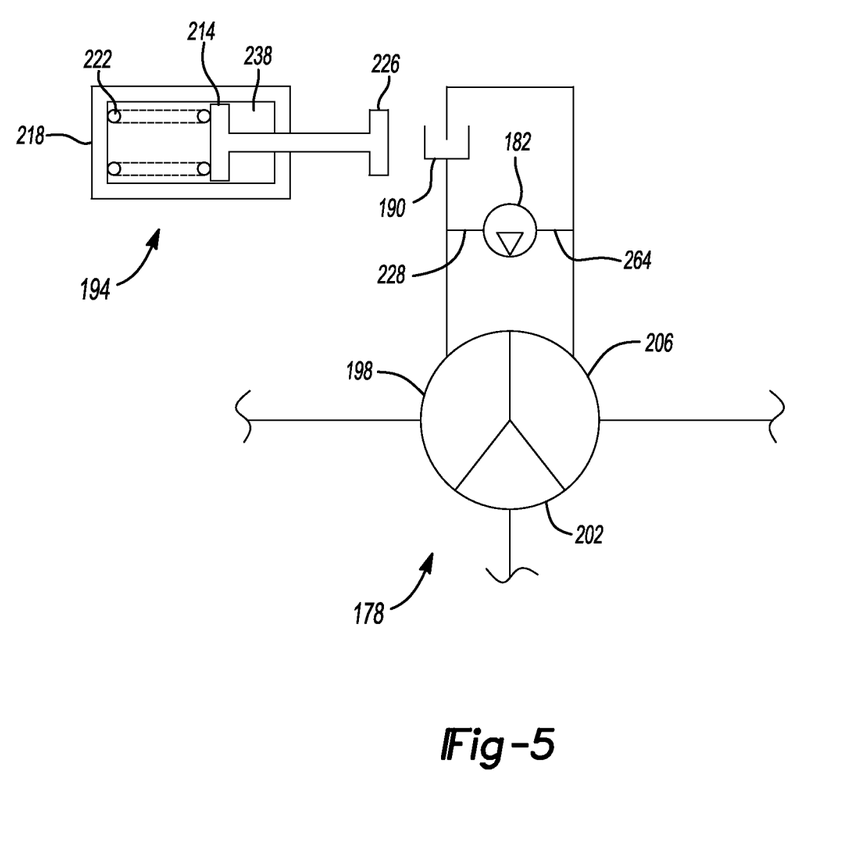
FIG. 5 is a schematic diagram of an alternate pump configuration for the torque converters shown in FIGS. 1-4.

With regard to FIG. 5, an alternative configuration of the pump 182 is illustrated. The pump 182 includes the pump input member 228, a pump output member 264, a pump driver (not shown) and a pump idler (not shown), the pump driver and pump idler being within the pump 182. The pump 182 can be any type of pump such that the pump driver and pump idler cooperate to pump fluid when rotated at different rotational speeds relative to each other. For example, the pump 182 can be a gerotor type pump, wherein the pump driver is an inner rotor (not shown) and the pump idler is an outer ring (not shown) of the gerotor pumping mechanism (not shown). The pump input member 228 is coupled for rotation with the pump driver and one of the impeller 198 and the turbine 206. The pump output member 264 is coupled for rotation with the pump idler and the other one of the impeller 198 and the turbine 206. Thus, the pump input member 228 is rotationally driven at all times when the one of the impeller 198 and the turbine 206 is rotationally driven, and the pump output member 264 is rotationally driven at all times when the other one of the impeller 298 and the turbine 206 is rotationally driven. Since the pump 182 only pumps fluid when the pump input member 228 and pump output member 264 rotate at different speeds, the pump 182 provides fluid only when the impeller 198 and turbine 206 rotate at different speeds. In this manner, pumping capacity and related efficiency losses are related to the rotational speed difference between the impeller 198 and the turbine 206. It is understood that this pump configuration may be used with any of the manual transmission configurations illustrated in FIGS. 1-4. By using the pump configuration of FIG. 5 in any of the transmission configurations of FIGS. 1-4, complexity of the transmission can be reduced. For example, the pump gear 230, and pump gear selector 234 are eliminated. While included in the example provided, the lock-up clutch 190 and lock-up actuator 194 are understood to be optional.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting device for a vehicle having a power plant and a drivetrain, the power transmitting device comprising:
   a power member that receives torque from the power plant;
   an output member spaced from said power member that supplies torque to the drivetrain;
   a manual transmission that transmits torque to said output member at different rotational speeds, said manual transmission including at least a first gear set having a first gear ratio and a second gear set having a second gear ratio that is different from said first gear ratio; and
   a torque converter including an impeller, a turbine opposite said impeller that is rotatable relative to said impeller, and a stator that multiplies torque at said turbine when said impeller is rotating at a different speed than said turbine,
   wherein torque from said power member is multiplied through said torque converter and is transmitted to said output member when said first gear set is selected, and
   wherein torque from said power member is not multiplied through said torque converter when said second gear set is selected.

2. A power transmitting device as set forth in claim 1, further comprising:
   a lock-up clutch coupled to said impeller and said turbine of said torque converter that selectively couples rotation of said impeller and said turbine, said lock-up clutch providing an engaged state where said turbine is locked in rotation with said impeller and a disengaged state where said turbine is free to rotate at a different rotational speed than said impeller.

3. A power transmitting device as set forth in claim 2, further comprising:
a lock-up actuator connected to said lock-up clutch that switches said lock-up clutch between said engaged state and said disengaged state.

4. A power transmitting device as set forth in claim 3, wherein said lock-up actuator is movable between an engaged position where said lock-up actuator switches said lock-up clutch to said engaged state and a disengaged position where said lock-up actuator switches said lock-up clutch to said disengaged state.

5. A power transmitting device as set forth in claim 4, wherein said lock-up actuator is hydraulically controlled by a pump that is selectively coupled to said turbine.

6. A power transmitting device as set forth in claim 5, wherein said lock-up actuator has a biasing member that biases said lock-up actuator to said engaged position and wherein said pump moves said lock-up actuator to said disengaged position when said pump is coupled to said turbine.

7. A power transmitting device as set forth in claim 5, further comprising:
a manual selector movable between a first position causing said first gear set to rotationally drive said output member and a second position causing said second gear set to rotationally drive said output member, said manual selector being coupled to a pump selector that rotatably couples said pump with said turbine when said manual selector is in said first position and that rotatably decouples said pump from said turbine when said manual selector is in said second position.

8. A power transmitting device as set forth in claim 5, wherein said pump includes a first pump member rotatably coupled to said impeller of said torque converter and a second pump member rotatably coupled to said turbine of said torque converter such that said pump only pumps fluid when said impeller rotates at a different speed than said turbine.

9. A power transmitting device as set forth in claim 1, wherein said manual transmission includes an input member that carries said first gear set and said second gear set.

10. A power transmitting device as set forth in claim 9, wherein said impeller is coupled to and rotates with said power member, said turbine is coupled to and rotates with said input member, and said stator is fixed to a stationary element such that said torque converter transmits torque from said power member to said input member and one of said first gear set and said second gear set transmits torque from said input member to said output member.

11. A power transmitting device as set forth in claim 9, further comprising:
a manual selector movable between a first position causing said first gear set to rotationally drive said output member and a second position causing said second gear set to rotationally drive said output member; and
a first gear selector carried on said input member and that is coupled to said manual selector, wherein said first gear selector moves axially with respect to said input member to engage said first gear set and rotatably couple said first gear set with said input member when said manual selector is moved to said first position, and wherein said first gear selector moves axially with respect to said input member to disengage said first gear set and rotatably decouple said first gear set from said input member when said manual selector is moved to said second position.

12. A power transmitting device as set forth in claim 11, further comprising:
a torque converter selector carried on said input member and that is coupled to said manual selector and said first gear selector, wherein said torque converter selector moves axially with respect to said input member to rotatably couple said impeller of said torque converter with said input member when said manual selector is in said first position, and wherein said torque converter selector moves axially with respect to said input member to rotatably decouple said impeller from said input member when said manual selector is in said second position.

13. A power transmitting device as set forth in claim 12, wherein said first gear selector is coupled with said turbine of said torque converter such that said torque converter transmits torque from said input member to said first gear set when said manual selector is in said first position.

14. A power transmitting device as set forth in claim 11, further comprising:
a second gear selector carried on said input member and that is coupled to said manual selector, wherein said second gear selector moves axially with respect to said input member to engage said second gear set and rotatably couple said second gear set with said input member when said manual selector is moved to said second position, and wherein said second gear selector moves axially with respect to said input member to disengage said second gear set and rotatably decouple said second gear set from said input member when said manual selector is moved to said first position.

15. A power transmitting device as set forth in claim 9, wherein said torque converter is disposed annularly about said input member.

16. A power transmitting device as set forth in claim 9, wherein said stator of said torque converter is coupled to said input member by a one-way clutch.

17. A power transmitting device as set forth in claim 1, wherein said torque converter is disposed annularly about said output member.

18. A power transmitting device for a vehicle having a power plant and a drivetrain, the power transmitting device comprising:
a power member that receives torque from the power plant;
an input member that is coupled to said power member;
an output member spaced from said power member and said input member that supplies torque to the drivetrain;
a manual transmission that transmits torque to said output member at different rotational speeds, said manual transmission including at least a first gear set having a first gear ratio, a second gear set having a second gear ratio that is different from said first gear ratio, and a reverse gear set; and
a torque converter including an impeller that is rotatably coupled to said power member and that receives torque from said power member, a turbine opposite said impeller that is rotatable relative to said impeller and that is rotatably coupled to said first gear set, and a stator that is rotatably coupled to said input member by a one-way clutch and that multiplies torque at said turbine when said impeller is rotating at a different speed than said turbine, wherein torque from said power member is multiplied through said torque converter and is transmitted to said output member when one of said first gear set and said reverse gear set is selected, and wherein torque from said power member is not multiplied through said torque converter when said second gear set is selected.

19. A power transmitting device as set forth in claim 18, wherein said first gear set is carried on said input member and is driven by a first input gear that is coupled to and rotates with said turbine and wherein said second gear set is carried on said output member and is driven by a second input gear that is coupled to and rotates with said input member.

20. A power transmitting device for a vehicle having a power plant and a drivetrain, the power transmitting device comprising:
- a power member that receives torque from the power plant;
- an input member that is coupled to said power member;
- an output member spaced from said power member and said input member that supplies torque to the drivetrain;
- a manual transmission that transmits torque to said output member at different rotational speeds, said manual transmission including at least a first gear set having a first gear ratio and a second gear set having a second gear ratio that is different from said first gear ratio; and
- a torque converter including an impeller that is coupled to said input member by said first gear set, a turbine opposite said impeller that is rotatable relative to said impeller and that is selectively coupled to said input member by said second gear set, and a stator that is coupled to said first gear set by a one-way clutch and that multiplies torque at said turbine when said impeller is rotating at a different speed than said turbine, wherein torque from said power member is multiplied through said torque converter and is transmitted to said output member when said first gear set is selected, and wherein torque from said power member is not multiplied through said torque converter when said second gear set is selected.

21. A power transmitting device for a vehicle having a power plant and a drivetrain, the power transmitting device comprising:
- a power member that receives torque from the power plant;
- an output member spaced from said power member that supplies torque to the drivetrain;
- a manual transmission that transmits torque to said output member at different rotational speeds, said manual transmission including at least a first gear set having a first gear ratio and a second gear set having a second gear ratio that is different from said first gear ratio; and
- a torque converter including an impeller, a turbine opposite said impeller that is rotatable relative to said impeller, and a stator that multiplies torque at said turbine when said impeller is rotating at a different speed than said turbine, wherein torque from said power member is multiplied through said torque converter and is transmitted to said output member when said first gear set is selected, wherein torque from said power member is not multiplied through said torque converter when said second gear set is selected, and wherein torque from said power member is transmitted to said output member independent of said torque converter when said second gear is selected.

22. A power transmitting device for a vehicle having a power plant and a drivetrain, the power transmitting device comprising:
- a power member that receives torque from the power plant;
- an output member spaced from said power member that supplies torque to the drivetrain;
- a manual transmission that transmits torque to said output member at different rotational speeds, said manual transmission including at least a first gear set having a first gear ratio, a second gear set having a second gear ratio that is different from said first gear ratio, and an input member that is selectively coupled to said first gear set and said second gear set;
- a torque converter connected in series with said manual transmission including an impeller rotatably coupled to said power member, a turbine opposite said impeller that is rotatable relative to said impeller and that is rotatably coupled to said input member, and a stator fixed to a ground that multiplies torque at said turbine when said impeller is rotating at a different speed than said turbine;
- a lock-up clutch rotatably coupled to said impeller and said turbine that has an engaged state where said lock-up clutch locks rotation of said impeller with said turbine such that torque from said power member is transmitted to said impeller and is transmitted through said lock-up clutch to said turbine and a disengaged state where said lock-up clutch permits rotation of said impeller relative to said turbine such that torque from said power member is transmitted to said impeller, is multiplied in said torque converter, and is transmitted to said turbine; and
- a lock-up actuator connected to said lock-up clutch wherein said lock-up actuator switches said lock-up clutch to said disengaged state when said first gear set is selected and said engaged state when said second gear set is selected.

* * * * *